(12) United States Patent
Shekyan et al.

(10) Patent No.: US 9,800,602 B2
(45) Date of Patent: Oct. 24, 2017

(54) AUTOMATED HARDENING OF WEB PAGE CONTENT

(71) Applicant: Shape Security, Inc., Palo Alto, CA (US)

(72) Inventors: Sergey Shekyan, Redwood City, CA (US); Michael Coates, San Francisco, CA (US); Wesley Hales, Mountain View, CA (US); Tim Peacock, San Francisco, CA (US); Justin Call, Mountain View, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

(21) Appl. No.: 14/502,893

(22) Filed: Sep. 30, 2014

(65) Prior Publication Data
US 2016/0094575 A1    Mar. 31, 2016

(51) Int. Cl.
*G06F 21/56* (2013.01)
*H04L 29/06* (2006.01)
*G06F 17/30* (2006.01)
*G06F 21/57* (2013.01)

(52) U.S. Cl.
CPC ...... *H04L 63/1433* (2013.01); *G06F 17/3089* (2013.01); *G06F 21/56* (2013.01); *G06F 21/568* (2013.01); *G06F 21/577* (2013.01); *G06F 2221/2125* (2013.01)

(58) Field of Classification Search
CPC ....... H04L 63/14; G06F 21/577; G06F 21/55; G06F 2221/2119
See application file for complete search history.

(56) References Cited

U.S. PATENT DOCUMENTS

| | | |
|---|---|---|
| 5,974,549 A | 10/1999 | Golan |
| 5,987,611 A | 11/1999 | Freund |
| 6,161,185 A | 12/2000 | Guthrie et al. |
| 6,606,663 B1 | 8/2003 | Liao |
| 6,938,170 B1 | 8/2005 | Kraft et al. |
| 7,058,699 B1 | 6/2006 | Chiou et al. |
| 7,117,429 B2 | 10/2006 | Vedullapalli et al. |
| 7,174,565 B2 | 2/2007 | Kadyk et al. |
| 7,180,895 B2 | 2/2007 | Smith |
| 7,334,254 B1 | 2/2008 | Boydstun et al. |
| 7,464,326 B2 | 12/2008 | Kawai et al. |
| 7,480,385 B2 | 1/2009 | Weber |
| 7,500,099 B1 | 3/2009 | McElwee et al. |
| 7,707,223 B2 | 4/2010 | Zubenko et al. |

(Continued)

FOREIGN PATENT DOCUMENTS

WO    WO 2017/007705    1/2017

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: URL:http://web.archive.org/web/20130623080604/http://weis2012.econinfosec.org/papers/Anderson_WEIS2012.pdf>, 31 pages, Jun. 2012.

(Continued)

*Primary Examiner* — Izunna Okeke

(57) ABSTRACT

Methods and apparatus are described for automatically modifying web page source code to address a variety of security vulnerabilities such as, for example, vulnerabilities that are exploited by mixed content attacks.

22 Claims, 3 Drawing Sheets

(56) References Cited

U.S. PATENT DOCUMENTS

| | | | |
|---|---|---|---|
| 7,836,425 B2 | 11/2010 | Rubin et al. |
| 7,895,653 B2 | 2/2011 | Calo et al. |
| 7,913,300 B1 | 3/2011 | Flank et al. |
| 7,940,657 B2 | 5/2011 | Perreault et al. |
| 8,020,193 B2 | 9/2011 | Bhola et al. |
| 8,086,756 B2 | 12/2011 | Kamyshenko et al. |
| 8,086,957 B2 | 12/2011 | Bauchot et al. |
| 8,170,020 B2 | 5/2012 | Oliver et al. |
| 8,200,958 B2 | 6/2012 | Coppola et al. |
| 8,225,401 B2 | 7/2012 | Sobel et al. |
| 8,266,202 B1 | 9/2012 | Colton et al. |
| 8,332,952 B2 | 12/2012 | Zhang et al. |
| 8,392,576 B1 | 3/2013 | Henderson |
| 8,453,126 B1 | 5/2013 | Ganelin |
| 8,527,774 B2 | 9/2013 | Fallows et al. |
| 8,533,480 B2 | 9/2013 | Pravetz et al. |
| 8,548,998 B2 | 10/2013 | Plotnik et al. |
| 8,555,388 B1 | 10/2013 | Wang et al. |
| 8,561,193 B1 | 10/2013 | Srivastava et al. |
| 8,589,405 B1 | 11/2013 | Estan |
| 8,590,014 B1 | 11/2013 | Haugsnes |
| 8,621,197 B2 | 12/2013 | Suryanarayana et al. |
| 8,627,479 B2 | 1/2014 | Wittenstein et al. |
| 8,677,481 B1 | 3/2014 | Lee |
| 8,689,330 B2 | 4/2014 | Sinn et al. |
| 8,762,962 B2 | 6/2014 | Ben-Artzi et al. |
| 8,782,744 B1 | 7/2014 | Fuller et al. |
| 9,008,620 B2 | 4/2015 | Ho et al. |
| 9,241,004 B1* | 1/2016 | April .............. G06F 17/2247 |
| 2002/0099827 A1 | 7/2002 | Shah et al. |
| 2002/0199116 A1 | 12/2002 | Hoene et al. |
| 2004/0088651 A1 | 5/2004 | McKnight et al. |
| 2004/0162994 A1 | 8/2004 | Cohen et al. |
| 2004/0237071 A1 | 11/2004 | Hollander et al. |
| 2004/0245525 A1 | 12/2004 | Yamazaki et al. |
| 2004/0249938 A1 | 12/2004 | Bunch |
| 2005/0108562 A1 | 5/2005 | Khazan |
| 2005/0114705 A1 | 5/2005 | Reshef et al. |
| 2005/0165902 A1 | 7/2005 | Hellenthal et al. |
| 2005/0182958 A1 | 8/2005 | Pham |
| 2005/0216770 A1 | 9/2005 | Rowett et al. |
| 2005/0240999 A1 | 10/2005 | Rubin et al. |
| 2005/0251536 A1 | 11/2005 | Harik |
| 2006/0053295 A1 | 3/2006 | Madhusudan et al. |
| 2006/0095968 A1 | 5/2006 | Portolani et al. |
| 2006/0155869 A1 | 7/2006 | Nanduri et al. |
| 2006/0282897 A1 | 12/2006 | Sima et al. |
| 2006/0288418 A1 | 12/2006 | Yang et al. |
| 2007/0011295 A1 | 1/2007 | Hansen |
| 2007/0064617 A1 | 3/2007 | Reves |
| 2007/0074227 A1 | 3/2007 | Naidu et al. |
| 2007/0118669 A1 | 5/2007 | Rand |
| 2007/0276950 A1 | 11/2007 | Dadhia |
| 2008/0031447 A1 | 2/2008 | Geshwind et al. |
| 2008/0183902 A1 | 7/2008 | Cooper et al. |
| 2008/0222736 A1 | 9/2008 | Boodaei et al. |
| 2009/0007243 A1 | 1/2009 | Boodaei et al. |
| 2009/0013407 A1 | 1/2009 | Doctor et al. |
| 2009/0070459 A1 | 3/2009 | Cho et al. |
| 2009/0099988 A1 | 4/2009 | Stokes et al. |
| 2009/0144829 A1 | 6/2009 | Grigsby et al. |
| 2009/0158430 A1 | 6/2009 | Borders |
| 2009/0193497 A1 | 7/2009 | Kikuchi et al. |
| 2009/0193513 A1 | 7/2009 | Agarwal et al. |
| 2009/0241174 A1 | 9/2009 | Rajan et al. |
| 2009/0249310 A1 | 10/2009 | Meijer et al. |
| 2009/0282062 A1 | 11/2009 | Husic |
| 2009/0292984 A1 | 11/2009 | Bauchot et al. |
| 2010/0100927 A1 | 4/2010 | Bhola et al. |
| 2010/0115594 A1 | 5/2010 | Paya et al. |
| 2010/0125612 A1 | 5/2010 | Amradkar et al. |
| 2010/0191962 A1 | 7/2010 | Yan et al. |
| 2010/0235637 A1 | 9/2010 | Lu et al. |
| 2010/0235910 A1 | 9/2010 | Ku et al. |
| 2010/0257354 A1 | 10/2010 | Johnston et al. |
| 2010/0262780 A1 | 10/2010 | Mahan et al. |
| 2010/0287132 A1 | 11/2010 | Hauser |
| 2011/0015917 A1 | 1/2011 | Wang et al. |
| 2011/0022846 A1 | 1/2011 | Ginter et al. |
| 2011/0047169 A1 | 2/2011 | Leighton et al. |
| 2011/0107077 A1 | 5/2011 | Henderson et al. |
| 2011/0131416 A1 | 6/2011 | Schneider |
| 2011/0154021 A1 | 6/2011 | McCann et al. |
| 2011/0154308 A1 | 6/2011 | Lobo |
| 2011/0178973 A1 | 7/2011 | Lopez et al. |
| 2011/0239113 A1 | 9/2011 | Hung et al. |
| 2011/0283110 A1 | 11/2011 | Dapkus et al. |
| 2011/0289566 A1 | 11/2011 | Resch et al. |
| 2011/0296391 A1 | 12/2011 | Gass et al. |
| 2011/0302623 A1 | 12/2011 | Ricci |
| 2011/0314091 A1 | 12/2011 | Podjarny |
| 2011/0320816 A1 | 12/2011 | Yao et al. |
| 2012/0011262 A1 | 1/2012 | Cheng et al. |
| 2012/0022942 A1 | 1/2012 | Holloway et al. |
| 2012/0096116 A1 | 4/2012 | Mislove et al. |
| 2012/0117649 A1 | 5/2012 | Holloway et al. |
| 2012/0124372 A1 | 5/2012 | Dilley |
| 2012/0198528 A1 | 8/2012 | Baumhof |
| 2012/0216251 A1 | 8/2012 | Kumar et al. |
| 2012/0240211 A1 | 9/2012 | Counterman |
| 2012/0246722 A1 | 9/2012 | Boney |
| 2012/0311715 A1* | 12/2012 | Tal ............... G06F 21/552 726/25 |
| 2013/0055287 A1 | 2/2013 | Pope et al. |
| 2013/0061055 A1 | 3/2013 | Schibuk |
| 2013/0086669 A1 | 4/2013 | Sondhi et al. |
| 2013/0091425 A1 | 4/2013 | Hughes et al. |
| 2013/0091582 A1 | 4/2013 | Chen et al. |
| 2013/0139235 A1 | 5/2013 | Counterman |
| 2013/0173782 A1 | 7/2013 | Ragutski et al. |
| 2013/0198607 A1 | 8/2013 | Mischook et al. |
| 2013/0205019 A1 | 8/2013 | Oellermann |
| 2013/0212603 A1 | 8/2013 | Cooke et al. |
| 2013/0219256 A1 | 8/2013 | Lloyd et al. |
| 2013/0227397 A1 | 8/2013 | Tvorun et al. |
| 2013/0232234 A1 | 9/2013 | Kapur et al. |
| 2013/0263264 A1 | 10/2013 | Klein et al. |
| 2013/0340043 A1 | 12/2013 | Zarei et al. |
| 2014/0040787 A1 | 2/2014 | Mills et al. |
| 2014/0053059 A1 | 2/2014 | Weber et al. |
| 2014/0089786 A1 | 3/2014 | Hashmi |
| 2014/0123242 A1 | 5/2014 | Sprunk et al. |
| 2014/0189499 A1 | 7/2014 | Gigliotti et al. |
| 2014/0189808 A1 | 7/2014 | Mahaffey et al. |
| 2014/0250514 A1 | 9/2014 | Blomquist et al. |
| 2014/0298469 A1 | 10/2014 | Marion |
| 2015/0134956 A1 | 5/2015 | Stachura et al. |
| 2017/0013012 A1 | 1/2017 | Hansen |

OTHER PUBLICATIONS

Boston University Information Services & Technology [online]. "Understanding Authentication, Authorization, and Encryption," published before Jul. 1, 2014, [Retrieved only Jul. 1, 2014]. Retrieved from Internet: <URL: http://www.bu.edu/tech/services/security/resources/bestpractice/auth/>. 4 pages.

Currie et al., "In-the-wire authentication: Protecting client-side critical data fields in secure network transactions," 2nd International Conference on Adaptive Science and Technology, 2009, pp. 232-237.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclagb.tuwien.ac.at/papers /driveby.pdf>, 19 pages, 2009.

Entrust, "Defeating Man-in the Browser Malware," Entrust.com [online] Sep. 2012 [retrieved Oct. 15, 2013]. Retrieved from the Internet: <URL: http://download.entrust.com/resources/download.cfm/24002/>, 18 pages.

(56) References Cited

OTHER PUBLICATIONS

Indiana University [online]. "Authentication vs. Authorization," published before Jul. 1, 2014, [Retrieved on Jul. 1, 2014]. Retrieved from Internet: <URL: https://protect.iu.edu/cybersecurity/authn-authz>. 3 pages.
Krebs on Security, In-depth security news and investigation, "A Closer Look at Rapport from Trusteer", dated Apr. 29, 2010.
Marcus and Sherstobitoff, "Dissecting Operation High Roller, " McAfee [online] 2012 [retrieved on Oct. 15, 2013]. Retrieved from the Internet <URL: http//www.mcafee.com/us/resources/reports/rpoperations-high-roller.pdf>, 20 pages.
Shackleford, D. "Application Whitelisting: Enhancing Host Security," SANS Institute Reading Room, Oct. 2009, 16 pages.
Wikipedia [online]. "MD5," Jun. 30, 2014, [Retrieved on Jul. 1, 2014]. Retrieved from Internet: <URL: https://en.wikipedia.org/w/index.php?title=MD5&oldid=615031889>. 12 pages.
PCT International Search Report and Written Opinion dated Dec. 22, 2015 issued in PCT/US2015/052030 [SSC1P002WO].
U.S. Appl. No. 13/660,573, filed Oct. 25, 2012, Schibuk.
U.S. Appl. No. 14/542,269, filed Nov. 14, 2014, Stachura et al.
U.S. Appl. No. 61/904,082, filed Nov. 14, 2013, Stachura et al.
Yang, U.S. Appl. No. 15/011,172, filed 01/29/2016, Advisory Action, dated Nov. 4 2016.
CTNF, dated Dec. 24 2014, re: Justin Call, U.S. Appl. No. 14/055,583, filed on Oct. 16 2013.
NOA, dated Aug. 24 2015, re: Subramanian Varadarajan, U.S. Appl. No. 14/290,805, filed on May 29 2014.
CTFR, dated Jan. 14 2015, re: Subramanian Varadarajan, U.S. Appl. No. 14/290,805, filed on May 29 2014.
CTNF, dated Sep. 5, 2014, re: Subramanian Varadarajan, U.S. Appl. No. 14/290,805, filed on May 29, 2014.
CTFR, dated Dec. 30, 2014, re: Justin Call, U.S. Appl. No. 14/290,835, filed on May 29 2014.
CTNF, dated Jul. 30 2014, re: Justin Call, U.S. Appl. No. 14/290,835, filed on May 29 2014.
NOA, dated Mar. 11 2015, re. Justin Call, U.S. Appl. No. 14/290,835, filed on May 29 2014.
NOA, dated Oct. 24, 2016, re: Sergey Shekyan, U.S. Appl. No. 14/502,893, filed on Sep. 30 2014.
CTNF, dated Apr. 20 2016, re: Sergey Shekyan, U.S. Appl. No. 14/502,893, filed on Sep. 30 2014.
CTNF, dated May 6 2016, re: Yao Zhao, U.S. Appl. No. 14/552,331, filed on Nov. 11 2014.
NOA, dated Aug. 17 2016, re: Yao Zhao, U.S. Appl. No. 14/552,331, filed on Nov. 25 2014.
CTNF, dated Apr. 28 2016, re: Ariya Hidayat, U.S. Appl. No. 14/673,669, filed on Mar. 30 2015.
NOA, dated Nov. 21 2016, re: Ariya Hidayat, U.S. Appl. No. 14/673,669, filed on Mar. 30 2015.
NOA, dated Dec. 22 2016, re: Ariya Hidayat, U.S. Appl. No. 14/673,669, filed on Mar. 30 2015.
NOA, dated Jan. 9, 2017, re: Ariya Hidayat, U.S. Appl. No. 14/673,669, filed on Mar. 30, 2015.
CTNF, dated Oct. 21 2016, re: Justin Call, U.S. Appl. No. 14/738,913, filed on Jun. 14 2015.
NOA, dated Mar. 16 2017, re: Justin Call, U.S. Appl. No. 14/738,913, filed on Jun. 14 2015.
CTFR, dated Aug. 12 2016, re: Subramanian Varadarajan, U.S. Appl. No. 14/923,603, filed on Oct. 27 2015.
NOA, dated Dec. 1 2016, re: Subramanian Varadarajan, U.S. Appl. No. 14/923,603, filed on Oct. 27 2015.
CTFR, dated Aug. 23 2016, re: Siying Yang, U.S. Appl. No. 15/011,172, filed on Jan. 29 2016.
CTNF, dated Apr. 18 2016, re: Siying Yang, U.S. Appl. No. 15/011,172, filed on Jan. 29 2016.
International Search Report, dated Apr. 22 2016, PCT/US16/18081.
International Search Report, dated Jan. 19 2016, PCT/US15/49024.
International Search Report, dated Aug. 25 2015, PCT/US15/32060.
International Search Report, dated Sep. 22 2016, PCT/US16/40645.
International Search Report, dated Jul. 1 2016, PCT/US16/25092.
International Search Report, dated Apr. 7 2016, PCT/US15/62206.
CTNF, dated Jun. 21 2017, re: Zhiwei Li, U.S. Appl. No. 14/718,736, filed on May 21 2015.

\* cited by examiner

AUTOMATED HARDENING OF WEB PAGE CONTENT

BACKGROUND

Web sites and applications are vulnerable to attack by malicious third parties. One class of security vulnerabilities relates to the fact that a web page may include content or resources from a number of different sources. If any of the resources loaded by a web page uses an unsecure channel (e.g., an unencrypted network connection), a "man-in-the-middle" attacker (e.g., someone who has access to the unsecure channel between an end user's browser and the server delivering the web page) can eavesdrop or inject his own malicious content that can rewrite or otherwise alter the content of the web page; including delivery of malware to the end user. For example, if all of the resources associated with a web page are loaded via secure channels but the fonts are loaded using a plain text connection, an attacker can overwrite the fonts with a payload that can take advantage of vulnerabilities in browser components responsible for font handling. These kinds of vulnerabilities are commonly referred to as "mixed content" vulnerabilities. Some technologies, e.g., browser security directives, have been developed to mitigate some attack vectors, but many of these solutions are difficult to understand, implement, or maintain.

SUMMARY

According to various implementations, computer-implemented methods, systems, and computer program products are provided that enable the automated modification of web page source code and/or HTTP headers to address a variety of security vulnerabilities. Source code and one or more headers corresponding to a web page requested by a client device are received. The source code is rendered to generate rendered code. The rendered code is processed to identify one or more security vulnerabilities. One or both of the source code and the one or more headers is/are modified to address the one or more security vulnerabilities thereby generating modified code. The modified code is transmitted to the client device.

According to some implementations, processing the rendered code includes identifying an unsecure channel corresponding to a resource identified by the source code. According to a specific implementation, modifying one or both of the source code and the one or more headers includes specifying a security directive requiring use of a secure channel by a browser on the client device to access the resource. According to a more specific implementation, it is determined that the resource supports communication via the secure channel. According to another specific implementation, modifying the source code includes inserting first code in the source code, the first code being configured to access the resource via a secure channel. According to another specific implementation, the resource is caused to be hosted in a secure server or domain, and modifying the source code includes rewriting the source code to access the resource at the secure server or domain.

According to some implementations, processing the rendered web page includes identifying an executable script in the source code. According to specific implementation, modifying the source code includes rewriting the source code to remove the executable script and causing the executable script to be hosted in a secure server or domain.

According to some implementations, modifying one or both of the source code and the one or more headers includes specifying an X-Frame options header, or inserting frame-breaking code in the source code.

According to some implementations, a determination is made as to whether one or more modifications to the source code would result in the web page being undeliverable to the client device.

According to some implementations, a report is generated specifying the one or more security vulnerabilities. The report is transmitted to a representative of a web site operator from which the web page originated. Authorization is received from the representative of the web site operator to proceed with modification of one or both of the source code and the one or more headers.

According to some implementations, modifying one or both of the source code and the one or more headers includes specifying one or more security directives for use by a browser on the client device.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes techniques that involve the automated modification of web page source code and/or HTTP headers to address a variety of security vulnerabilities such as, for example, those that are exploited by mixed content attacks. Before being delivered to a requesting client, the web page source code is rendered and analyzed to identify security vulnerabilities. Such vulnerabilities might include the use of an unsecure channel for accessing additional resources and content that may be located at external locations or hosted by the primary application on the same domain, a subdomain, or an alternate domain that is owned by the primary application. Other security vulnerabilities might include, for example, the lack or insecure configuration of an X-frame options HTTP header, the lack of control over whether a resource is allowed to be rendered within an <iframe> element, etc. Once identified, the security vulnerabilities are addressed by appropriate modification to the web page source code and/or the HTTP response headers. This might involve any of a variety of actions to harden the source code before it can be transmitted to and rendered by the client. It might also involve specification of browser directives (via source code modification or modification of HTTP response headers) to be enforced by the requesting client browser. Specific implementations will now be described with reference to the accompanying figures.

Figure 1:
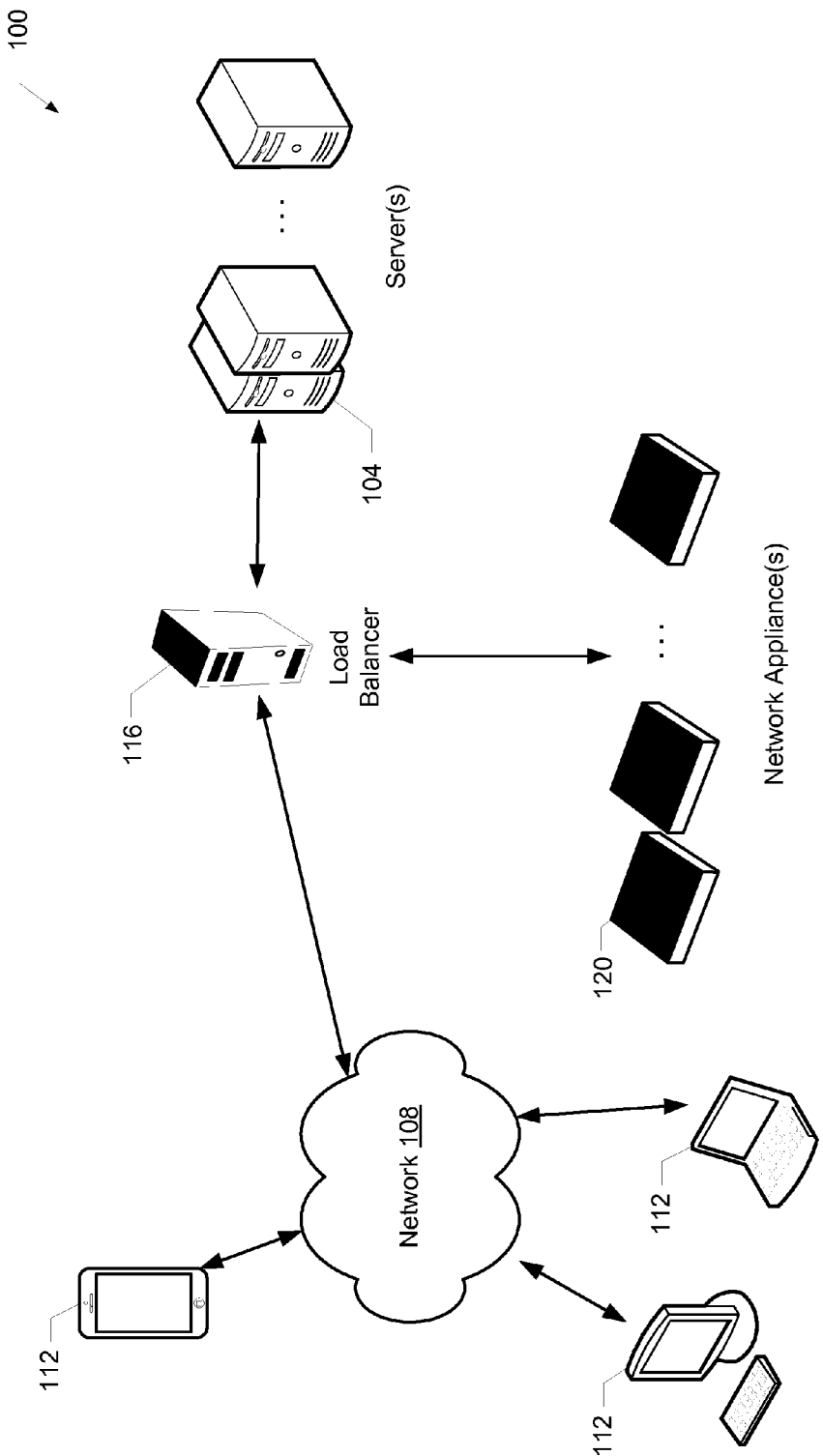
FIG. 1 is a simplified diagram of a computing environment in which particular implementations may be practiced.

FIG. 1 illustrates an example of a computing environment 100 in which web page source code and/or HTTP headers may be modified for the purpose of addressing various security vulnerabilities. In this environment, one or more servers 104 serve web pages via a network 108 to one or more client devices 112. Network 108 represents any subset or combination of a wide array of network environments, including the internet, public networks, private networks, local area networks, TCP/IP-based networks, telecommunications networks, wireless networks, cable networks, etc. Client devices 112 include any device capable of requesting web pages served by server(s) 104. For instance, such devices might include a desktop computer, a laptop computer, a tablet, a smartphone, a set top box, a wearable computing device, etc.

A load balancer 116 (or multiple such load balancers) acts as an intermediary between servers 104 and network 108, distributing source code (e.g., web pages served by servers 104) to one or more network appliances 120. Network appliance(s) 120 process at least a portion of the source code received, identifying security vulnerabilities, and modifying the source code and/or associated headers accordingly. Network appliance(s) 120 provide the modified source code to requesting client devices 112 via load balancer 116 and network 108. According to various implementations, network appliance(s) 120 may be deployed in a variety of locations including, for example, in the network of primary content provider associated with the web pages being served, in a Content Delivery Network (CDN), in the network of an ISP, etc. Implementations are also contemplated in which the various functionalities described herein are implemented in any of a variety of devices that work together to deliver web pages to client devices including, for example, the virtual and/or physical servers from which the pages are served, load balancers, routers, etc. The scope of this disclosure should therefore not be limited by reference to some of the specific implementations details described herein.

Figure 2:
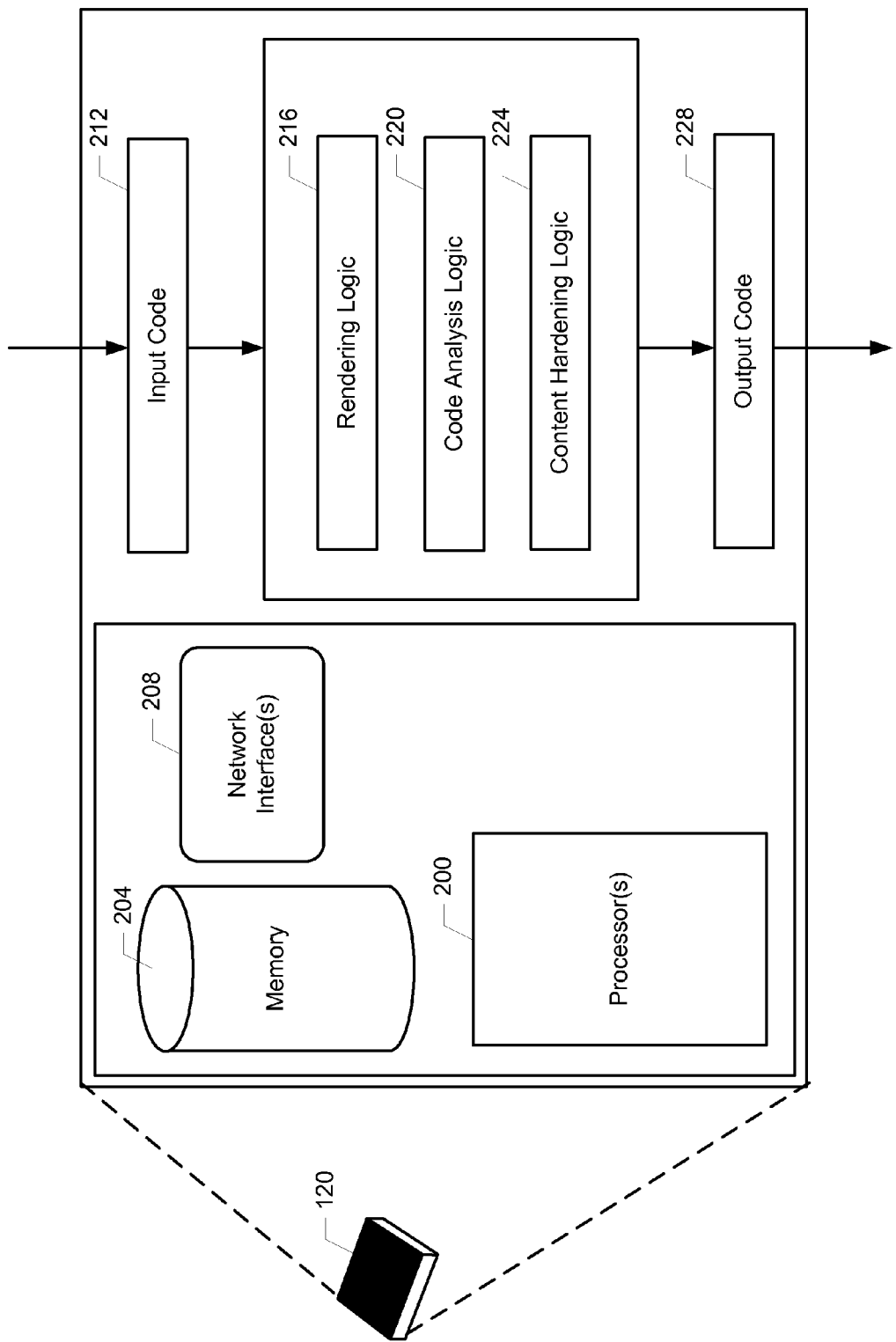
FIG. 2 is a simplified diagram of a computing platform in which particular implementations may be practice.

A simplified block diagram of an example of a network appliance 120 in which some implementations may be implemented is shown in FIG. 2. Appliance 120 includes one or more processors 200, including one or more single or multi-core processors configured to execute stored instructions. Appliance 120 also includes one or more memories 204. Memory 204 includes computer-readable storage media that may include any of a wide variety of forms of volatile and non-volatile storage media. For example, memory 204 could include electronic storage media, magnetic storage media, optical storage media, quantum storage media, mechanical storage media, etc. Memory 204 provides non-transitory storage for computer readable instructions, data structures, program modules and other data for the operation of appliance 120.

Appliance 120 also includes one or more network interfaces 208. Network interface(s) 208 may be used to connect via wired or wireless connections to cellular networks, including the internet, public networks, private networks, local area networks, etc. For example, network interfaces 208 may include modules for a T-carrier such as a T1 or T3 line, an optical carrier line such as a line to a synchronous optical network or a fiber optic network, an Ethernet connection, a digital subscriber line, a telephone line, a coaxial cable, etc. Network interfaces 208 might also include radio frequency modules, e.g., for a 3G or 4G cellular network, a WiFi local area network, a Bluetooth private network, etc. Appliance 120 also includes one or more buses or other internal communications hardware or software (not shown) that allow for the transfer of data and instructions between the various modules and components of the appliance.

While appliance 120 might have many functions, this disclosure focuses mainly on the use of appliance 120 to modify source code and/or HTTP headers associated with a web page for the purpose of addressing various security vulnerabilities associated with the web page. According to some implementations, appliance 120 receives input code 212 (e.g., web page source code and associated HTTP header(s)) through one or more network interfaces 208. The input code 212 is processed by a series of modules. While the number and variety of modules will vary depending on the specific implementation, the modules relevant to the depicted implementation are discussed below. It will be understood that these and other modules may be implemented by processor(s) 200 executing code in memory 204.

It should also be noted that, despite references to particular computing paradigms and/or software tools herein, the computer program instructions with which implementations within the scope of this disclosure are implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations or different devices. In addition, reference to particular protocols herein are merely by way of example. Suitable alternatives known to those of skill in the art (including those later developed) may be employed without departing from the scope of this disclosure.

Figure 3:
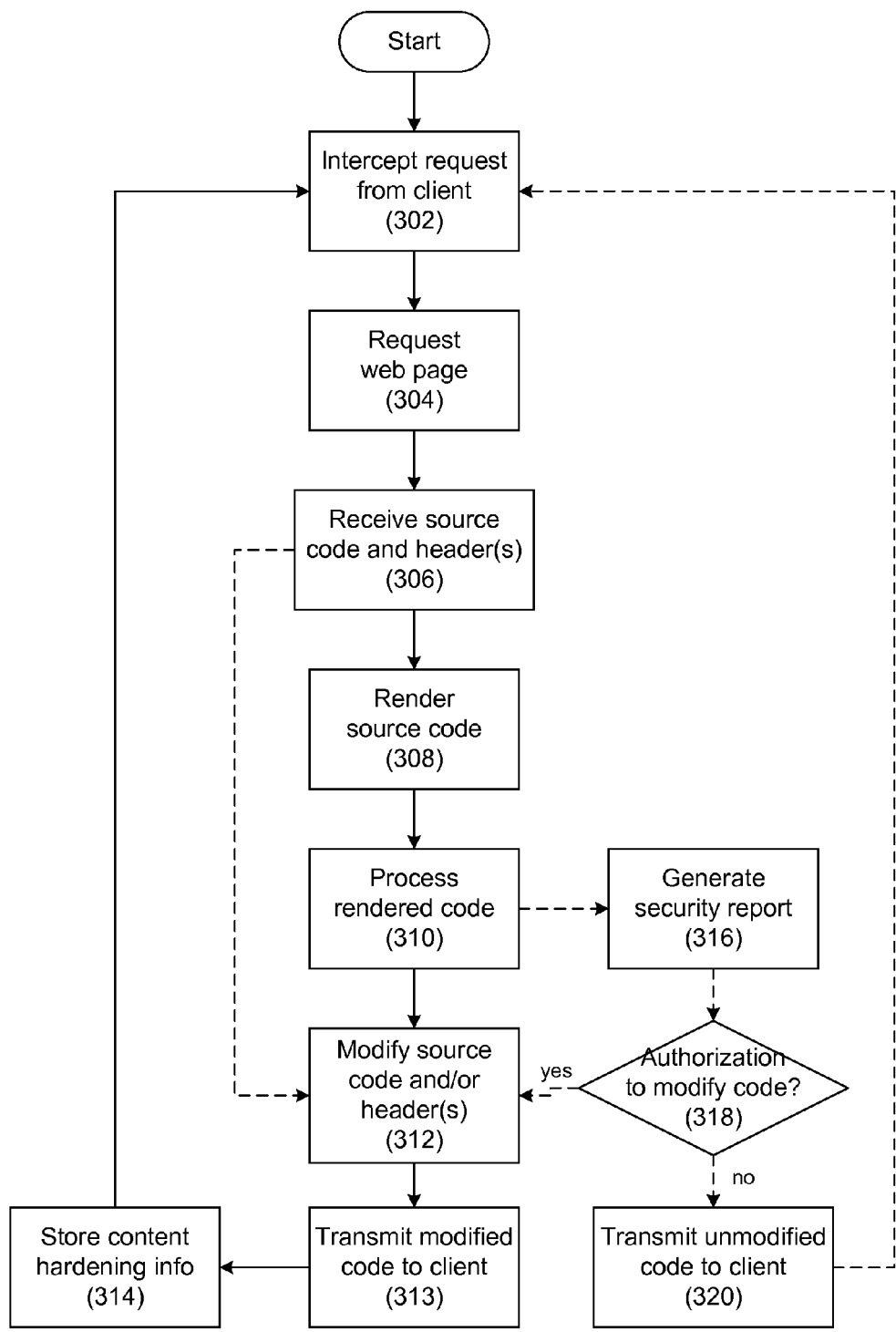
FIG. 3 is a flowchart illustrating operation of a particular implementation.

Referring again to FIG. 2 and to the flowchart of FIG. 3, a request for a web page generated by a browser operating on an end user's client device is intercepted by appliance 120 (302). Appliance 120 generates a request for the web page to the URL to which the original request was directed (304), e.g., a URL associated with one or more of servers 104 of FIG. 1. The source code and associated header(s) of the web page (e.g., input code 212) are received by rendering logic 216 (306) which might be, for example, a "headless" browser (i.e., a browser that operates without a graphical user interface). Alternatively, logic 216 may be configured to analyze raw HTML, JavaScript, CSS, and other web content using a variety of techniques including a combination of lexical, syntactic and/or semantic static analyses. It should be noted that implementations are contemplated in which the appliance need not intercept the request from the client. Instead, the request could reach the web server but the response to the request including the web page source code could be intercepted by appliance 120.

Rendering logic 216 renders the web page source code (308) in much the same way as a conventional browser, e.g., identifying and loading content from specified resources, executing inline scripts, etc. This results in rendered code that a conventional browser would normally display. Instead, code analysis logic 220 processes the rendered source code to identify one or more security vulnerabilities (310). One or more content hardening actions may then be taken by content hardening logic 224 to address at least some of the identified security vulnerabilities (312). The hardened source code (e.g., output code 228) is then delivered to the requesting client (313).

According to a particular implementation, analysis of the rendered source code includes building a source list of specified resources that are accessed by the page's source code (e.g., by examining the headers associated with the calls to the specified resources). As will be understood, the specified resources can correspond to any of a wide variety of objects, files, code, etc., including, for example, scripts (e.g., JavaScript, VBScript, Dart, etc.), styles (e.g., CSS styles), images, fonts, and containers (e.g., resources that can render various content types, e.g., flash files, pdfs, media files, etc.). The code analysis logic determines for each of the specified resources whether it represents one of a plurality of security vulnerabilities. Examples of such security vulnerabilities include but are not limited to communication via unsecure channels (e.g., clear text vs. encryption), injected scripts, UI redress, cross site scripting flaws, etc.

Content hardening actions include any of a variety of actions for addressing the identified security vulnerabilities. Content hardening actions may include modifications to or transformation of the source code of the web page before transmitting it to the requesting client device. Content hardening actions may also include modification of the source code and/or HTTP header(s) to specify browser directives to be enforced by the browser on the client device (e.g., Content Security Policy (CSP) directives, cookie directives, HSTS directives, etc.). Some content hardening actions may be specified, implemented, and/or enforced as described, for example, in the *Content Security Policy Level 2, W3C Last Call Working Draft* (3 Jul. 2014) from the World Wide Web Consortium (W3C) (the "CSP working draft"), the entire disclosure of which is incorporated herein by reference for all purposes. Some examples will be instructive.

As discussed above, a security vulnerability might be that a specified resource that the page's source code accesses communicates via an unsecure channel. In such a case, the content hardening action might include probing the resource to determine whether it supports communication via a secure channel and, if so, rewriting the corresponding references in the web page source code to connect with that resource via a secure channel (e.g., via HTTPS). Alternatively, if the resource does not support communication via a secure channel, the content hardening action may include downloading the content from the resource (e.g., to appliance 120 or an associated secure server) and rewriting the references in the web page source code to request the content from its new location via a secure channel.

Instead of or in addition to inline modifications of the source code, a set of browser directives may be specified by modification of the source code and/or associated HTTP header(s). For example, a directive could be specified to require the use of HTTP Strict Transport Security (HSTS) which enforces the use of HTTPS connections to specified resources, i.e., if a browser receives a web page with this feature enabled, it would not allow plain text connections to the specified resources. Another browser directive might enforce the transmission of cookies only over secure channels.

In another example, a browser directive could be specified that prohibits the browser from executing any inline script or, alternatively, only allows execution of script from specified sources. As another alternative, the content hardening logic could rewrite the web page content such that legitimate scripts would no longer be inline. This may be accompanied by the hosting of the scripts (e.g., by appliance 120 or an associated secure server or domain) and specifying content security policy headers preventing the execution of inline scripts. Such scripts may also be consolidated in a single trusted source. According to some implementations, scripts or other resources that are hosted separately from a rewritten page may be verified using hash values to ensure that a copy of code or content received is valid. Such hash verification may be accomplished, for example, as described in the CSP working draft incorporated by reference above.

According to yet another alternative, a "use strict" JavaScript directive may be specified that requires that any JavaScript code in the source code of a web page be executed in "strict mode." Inserting "use strict" at the beginning of a JavaScript file or function prevents a range of potentially problematic scripting practices including, for example, the use of undeclared variables, the deletion of a variable, a function, or an argument, the duplication of a parameter name, etc.

The HTTP headers associated with received web pages may also be examined to ensure that they correspond to a "white list" of headers/header types, or that they conform to one or more predefined canonical or normalized forms. Non-conforming headers can be converted to an authorized or normalized form. Enforcing the use of only authorized headers and/or header types prevents a wide range of attacks that relate to the introduction of or manipulation of HTTP headers.

Another security vulnerability might relate to so-called "click jacking" attacks that trick the user of a browser into taking actions he does not intend and of which he is unaware. For example, the user might be browsing a website www.site-x.com and a malicious operator of that website loads an invisible frame with content from website www.site-y.com, where user is already authenticated. While user thinks he is interacting with www.site-x.com, the malicious script sends user interactions to the invisible frame, i.e., the user unwittingly interacts with www.site-y.com. By specifying a directive that prohibits browsers from loading www.site-y.com in a frame this kind of attack can be prevented. Another content hardening action to deal with click jacking attacks might be the insertion of a script commonly known as a "frame buster" into the web page source code, e.g., a script that mitigates click jacking attacks by forcing the URL in the address bar of the browser to match the URL of the resource that is being forced to load in the main window rather than a frame.

In another example, a browser directive could be specified that requires authentication from specified resources accessed by a web page's source code. For example, before loading a frame from one domain into a page from another, such a directive could require authentication in the form of a checksum or hash (e.g., MD5 hash) that is unique to some combination of information from the two domains.

Another form of hardening includes potential mitigations of vulnerabilities in how SSL is applied. Misconfigurations of SSL and other web services can result in security vulnerabilities. The BREACH and CRIME attacks used properties of compression algorithms to reveal secret values (including session cookies and CSRF tokens). This security intermediary device can be aware of common misconfigurations that result in leakages. Using this knowledge it can reconfigure SSL and other properties of protected websites to prevent these attacks.

From time to time vulnerabilities, like Heartbleed, in widely used software libraries may become known. This network intermediary could implement remediations for these vulnerabilities without requiring any changes to the protected web servers.

In addition to particular types of modifications and/or restrictions for identified security vulnerabilities, implementations are also contemplated in which features or functions that are not employed by a given web page are disabled for that web page.

It should be apparent from the diversity of the foregoing examples that a wide range of content hardening actions are contemplated for addressing a similarly wide range of security vulnerabilities. The scope of this disclosure should therefore not be limited by reference to such examples.

Referring again to FIG. 3, once the source code for a web page has been analyzed and its security vulnerabilities identified, the set of content hardening actions may be cached (e.g., in memory 204 or another memory accessible to appliance 120) for use with that particular web page or with a set of web pages from the same domain (314). For example, this cached content hardening information may include a set of browser directives and/or other security countermeasures in the form of various types of source code modifications. This information may then be used for hardening the same page or pages from the same domain in connection with subsequent requests. This reduces the computing resources required to harden web content (as indicated by the dashed line from 306 to 312), potentially reducing the latency associated with delivery of the pages to the end user.

In addition to caching the set of content hardening actions, it may be useful to cache other information. For example, it might be useful to cache the results of the processing of the rendered web page source code, e.g., the one or more security vulnerabilities identified during the processing of the render code. Such information might be useful in identifying or determining content hardening actions to take for subsequent requests for the page that might not be available or appropriate for the earlier request. In another example, in which a human representative of a web site operator makes decisions about whether and what types of content hardening actions should be taken, representations of such decisions can be cached for application to subsequent requests.

According to a particular implementation, the content hardening information for a given page or domain is cached only temporarily to ensure that inappropriate modifications are not applied to later versions of a page. For example, the information may be cached for the same amount of time the source web site allows that same page to be cached. This would provide some level of confidence that the source code of the requested page is unlikely to have changed during that period of time.

Such browser directives may include any rules or directives that would harden the security of the web page without breaking the functionality of the web site. Before being applied, the information might be reported to the web site operator for approval or authorization. However, this step is optional.

As will be appreciated, it is desirable that content hardening actions not interfere with the functionality of the web page for which the source code has been modified. According to some implementations, the appliance may determine whether a particular content hardening action would have this effect, e.g., result in some or all of the web page content not being deliverable. For example, the appliance might determine that requiring the use of HTTPS would prevent some portion of a web page from being delivered because the specified resource corresponding to that content does not support HTTPS. In such a case, the appliance might decide not to include that directive in the modified source code. The appliance might also generate a warning relating to the identified security vulnerability; possibly including the fact that it was not addressed.

According to some implementations, appliance 120 may operate in a reporting mode in which it generates reports for the web site operator that identify the security vulnerabilities in its web pages (316) (e.g., the unsecure resources referenced by its web pages, vulnerable inline script, etc.) in order to give the web site operator the opportunity to approve or authorize and/or select from among proposed content hardening actions (318). For example, the web site operator might choose to have unsecure content associated with specified resources hosted and served by the appliance (or an associated secure server) as described above. Such reports may be generated even where automatic modification of at least some of the web page source code is already taking place. For example, the web site operator might be notified when a new security vulnerability has been identified before any further content hardening action is taken. Such reports to the web site operator might also be useful for identifying when content retrieved from a specified resource has already been compromised. That is, manual inspection by a human representative of the web site operator can more readily identify, for example, malicious scripts. If approval or authorization for content hardening has not been given, the unmodified source code is delivered to the requesting client device (320).

Examples of an original HTTP transaction (e.g., input code 212) and hardened code (e.g., output code 228) is provided below:

---

Input Code (unmodified HTTP response)
HTTP/1.1 200 OK
Server: nginx
Date: Tue, 15 Jul 2014 20:50:58 GMT
Content-Type: text/html; charset=utf-8
Transfer-Encoding: chunked
Connection: close
Vary: Accept-Encoding
Expires: Mon, 26 Jul 1997 05:00:00 GMT
Last-Modified: Tue, 15 Jul 2014 20:50:58 GMT
Cache-Control: no-store, no-cache, must-revalidate
Content-Encoding: gzip
Set-Cookie:abc=0x56c990fd745b8a95;expires=Thu,14-Jul-2016     20:56:31
GMT; path=/
Output Code (modified HTTP response)
HTTP/1.1 200 OK
Server: Apache 2.2
Date: Tue, 15 Jul 2014 20:50:58 GMT
Content-Type: text/html; charset=utf-8
Transfer-Encoding: chunked
Connection: (1)keep-alive
Vary: Accept-Encoding
Expires: Mon, 26 Jul 1997 05:00:00 GMT
Last-Modified: Tue, 15 Jul 2014 20:50:58 GMT
Cache-Control: no-store, no-cache, must-revalidate
Content-Encoding: gzip
Set-Cookie:abc=0x56c990fd745b8a95;expires=Thu,14-Jul-2016     20:56:31
GMT; path=/;(2)secure
Content-Security-Policy:     (3)default-src     https:;
(4)script-src
https://cdn.example.com; style-src https://cdn.example.com;
Strict-Transport-Security:(5)max-age=31536000;includeSubDomains

---

The bolded sections of the output code indicate the content hardening modifications. The parenthetical numbers are inserted for the purpose of identifying the effect of each modification. For example, modification (1) enforces reuse of a TCP connection. Modification (2) requires that cookies be sent only over a secure channel. Modification (3) requires the use of HTTPS for the main resource. Modification (4) enforces a source list of origins for scripts and styles based on the automatic analysis of the main resource. Modification (5) requires use of HTTP Strict Transport Security, i.e., requires the client browser to use only secure channels to access the main resource and (based on automatic analysis) possibly any subdomain resources as well.

Various implementations enabled by this disclosure provide protection against a wide variety of attack vectors. And because it is possible to store an understanding of a processed web site, additional countermeasures (including those that do not yet exist) can be applied to web sites without additional analysis. Further, because the analysis is automatic, countermeasures can be applied at little or no marginal cost. This is to be contrasted with traditional web security which requires hours of skilled labor to apply and maintain such countermeasures.

Moreover, the techniques described herein allow developers and providers of web content to focus on delivering content and functionality rather than on mitigating security vulnerabilities. That is, security standards are constantly evolving to keep up with the ever-changing security threat landscape. It is nearly impossible for the typical web developer to keep up with and incorporate best security practices into newly developed web content. It is similarly impractical for providers of web content to continuously update previously developed and deployed web content to stay ahead of new security vulnerabilities. By contrast, the techniques described herein (embodied, for example, in intermediary devices such as network appliances 120) provide efficient mechanisms by which web content can be hardened, and in which new security standards are readily integrated. Such techniques allow web developers and web content providers to focus on what they do best while, at the same time, giving them and their users the confidence that they are not vulnerable to attack.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method, comprising:
receiving source code and one or more headers corresponding to a web page requested by a client device;
using one or more physical processors, rendering the source code to generate rendered code;
using one or more of the physical processors, processing the rendered code to identify one or more security vulnerabilities including identification of an unsecure channel corresponding to a resource identified by the source code;
wherein processing the rendered code includes identifying a first reference in the source code to the resource to retrieve the resource via the unsecure channel;
using one or more of the physical processors, automatically modifying, responsive to processing the rendered code, one or both of the source code and the one or more headers thereby generating modified code, including inserting first code in the source code, the first code being configured to access the resource or content associated with the resource via a secure channel;
wherein modifying the source code includes removing the first reference to the resource, adding a second reference to the resource specifying a security directive requiring use of the secure channel by a browser on the client device, and causing the resource to be hosted on a secure server or domain; and
transmitting the modified code to the client device.

2. The method of claim 1, further comprising determining that the resource does not support secure communication.

3. The method of claim 1, further comprising determining that the resource supports communication via the secure channel.

4. The method of claim 2, further comprising causing, responsive to determining that the resource does not support secure communication, the content associated with the resource to be stored at a secure location, the secure location being accessible via the secure channel.

5. The method of claim 1, further comprising causing the resource or the content associated with the resource to be hosted in a secure server or domain, and wherein the first code is configured to access the resource or the content associated with the resource at the secure server or domain.

6. The method of claim 1, wherein the resource is an executable script.

7. The method of claim 1, wherein modifying one or both of the source code and the one or more headers includes specifying an X-Frame options header, or inserting frame-breaking code in the source code.

8. The method of claim 1, further comprising determining whether one or more modifications to the source code would result in the web page being undeliverable to the client device.

9. The method of claim 1, further comprising:
generating a report specifying the one or more security vulnerabilities;
transmitting the report to a representative of a web site operator from which the web page originated; and
receiving authorization from the representative of the web site operator to proceed with modification of one or both of the source code and the one or more headers.

10. The method of claim 1, wherein modifying one or both of the source code and the one or more headers includes specifying one or more security directives for use by a browser on the client device.

11. The method of claim 1, further comprising intercepting a request for the web page from the client device.

12. A system, comprising:
memory; and
one or more physical processors configured to:
receive source code and one or more headers corresponding to a web page requested by a client device;
render the source code to generate rendered code;
process the rendered code to identify one or more security vulnerabilities by identifying an unsecure channel corresponding to a resource identified by the source code;
wherein processing the rendered code includes identifying a first reference in the source code to the resource to retrieve the resource via the unsecure channel;
automatically modify, responsive to processing the rendered code, one or both of the source code and the one or more headers thereby generating modified code, including inserting first code in the source code, the first code being configured to access the resource or content associated with the resource via a secure channel;

wherein modifying the source code includes removing the first reference to the resource, adding a second reference to the resource specifying a security directive requiring use of the secure channel by a browser on the client device, and causing the resource to be hosted on a secure server or domain; and transmit the modified code to the client device.

13. The system of claim 12, wherein the one or more processors are further configured to determine that the resource does not support secure communication.

14. The system of claim 12, wherein the one or more processors are further configured to determine that the resource supports communication via the secure channel.

15. The system of claim 13, wherein the one or more processors are further configured to cause, responsive to determining that the resource does not support secure communication, the content associated with the resource to be stored at a secure location, the secure location being accessible via the secure channel.

16. The system of claim 12, wherein the the resource is an executable script.

17. The system of claim 12, wherein the one or more processors are configured to modify one or both of the source code and the one or more headers by specifying an X-Frame options header, or inserting frame-breaking code in the source code.

18. The system of claim 12, wherein the one or more processors are further configured to determine whether one or more modifications to the source code would result in the web page being undeliverable to the client device.

19. The system of claim 12, wherein the one or more processors are further configured to:

generate a report specifying the one or more security vulnerabilities;

transmit the report to a representative of a web site operator from which the web page originated; and receive authorization from the representative of the web site operator to proceed with modification of one or both of the source code and the one or more headers.

20. The system of claim 12, wherein the one or more processors are configured to modify one or both of the source code and the one or more headers by specifying one or more security directives for use by a browser on the client device.

21. The system of claim 12, wherein the one or more processors are further configured to intercept a request for the web page from the client device.

22. A computer program product, comprising one or more non-transitory computer-readable media having computer program instructions stored therein, the computer program instructions being configured such that, when executed by one or more computing devices, the computer program instructions cause the one or more computing devices to:

receive source code and one or more headers corresponding to a web page requested by a client device;

render the source code to generate rendered code;

process the rendered code to identify one or more security vulnerabilities by identifying an unsecure channel corresponding to a resource identified by the source code;

wherein processing the rendered code includes identifying a first reference in the source code to the resource to retrieve the resource via the unsecure channel;

automatically modify, responsive to processing the rendered code, one or both of the source code and one or more headers thereby generating modified code, including inserting first code in the source code, the first code being configured to access the resource or content associated with the resource via a secure channel;

wherein modifying the source code includes removing the first reference to the resource, adding a second reference to the resource specifying a security directive requiring use of the secure channel by a browser on the client device, and causing the resource to be hosted on a secure server or domain; and transmit the modified code to the client device.

* * * * *